United States Patent
Challapalli et al.

(10) Patent No.: US 8,015,217 B2
(45) Date of Patent: Sep. 6, 2011

(54) METHOD AND SYSTEM FOR OBTAINING USER DATA HAVING USER-DEFINED DATA TYPES

(75) Inventors: Kiran Challapalli, San Jose, CA (US); Kyle Jeffrey Charlet, Hollister, CA (US); Christopher M. Holtz, San Jose, CA (US); William W. Li, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 11/968,387

(22) Filed: Jan. 2, 2008

(65) Prior Publication Data

US 2009/0171997 A1    Jul. 2, 2009

(51) Int. Cl.
*G06F 17/30*    (2006.01)
(52) U.S. Cl. ........ 707/809; 707/705; 707/758; 707/793; 707/803
(58) Field of Classification Search .................. 707/1, 3, 707/5, 100, 102, 758, 759, 705, 760, 793, 707/803, 809
See application file for complete search history.

(56) References Cited

U.S. PATENT DOCUMENTS

| | | | |
|---|---|---|---|
| 5,394,546 A | | 2/1995 | Hanatsuka |
| 5,442,779 A | | 8/1995 | Barber et al. |
| 6,697,794 B1 | | 2/2004 | Milby |
| 6,708,186 B1 * | | 3/2004 | Claborn et al. ........ 707/999.102 |
| 7,007,037 B2 | | 2/2006 | Govindarajan et al. |
| 7,092,933 B1 | | 8/2006 | Milby |
| 7,308,460 B2 * | | 12/2007 | Venkatesh et al. ..... 707/999.004 |
| 7,325,007 B2 * | | 1/2008 | Castro et al. ........... 707/999.101 |
| 7,596,576 B2 * | | 9/2009 | Venkatesh et al. ..... 707/999.102 |
| 7,650,346 B2 * | | 1/2010 | Henaire et al. ................ 707/690 |
| 7,681,184 B1 * | | 3/2010 | Weedon et al. ................ 717/137 |
| 2005/0289504 A1 * | | 12/2005 | Buchmann et al. ........... 717/102 |
| 2009/0100084 A1 * | | 4/2009 | Jayadevan et al. ............ 707/102 |

OTHER PUBLICATIONS

Vanbenschoten, G., "Data Sharing in a Heterogeneous Database Environment", http://www.datawarehouse.com/article?articleid=5322, Apr. 29, 2005, 5 Pages.
IBM Corporation, "User-Defined Routines and Data Types Developer's Guide", IBM Informix User-Defined Routines and Data Types Developer's Guide, http://publib.boulder.ibm.com/infocenter/idshelp/v10/index.jsp?topic=/com.ibm.udr.doc/udr44.htm, Retrieved on Jun. 29, 2007, 4 Pages.
IBM Corporation, "Routine Resolution with User-Defined Data Types", IBM Informix User-Defined Routines and Data Types Developer's Guide, http://publib.boulder.ibm.com/infocenter/idshelp/v10/index.jsp?topic=/com.ibm.udr.doc/udr64.htm, Jun. 29, 2007, 2 Pages.
Kozoil, Q., et al., "Data Conversion of Arithmetic Data Types", http://www.hdfgroup.uiuc.edu/HDF5/doc_1.8pre/supplements/dtype_conversion/Conversion.html, Jun. 29, 2007, 9 Pages.

* cited by examiner

*Primary Examiner* — Debbie Le
*Assistant Examiner* — Dangelino N Gortayo
(74) *Attorney, Agent, or Firm* — Sawyer Law Group, P.C.

(57) ABSTRACT

The present invention relates generally to data retrieval, and more particularly but not exclusively to obtaining referentially converted user data having user-defined data types. In one implementation, the present invention is a method for retrieving user data in a data system using one or more application programs for defining a layout for each user data type, defining one or more conversion routines for non-standard data types, calling a coordination call to map standard and non-standard data types, and retrieve the user data from the data storage device.

8 Claims, 4 Drawing Sheets

101

METHOD AND SYSTEM FOR OBTAINING USER DATA HAVING USER-DEFINED DATA TYPES

FIELD OF THE INVENTION

The present invention relates generally to data retrieval, and more particularly but not exclusively to obtaining referentially converted user data having user-defined data types.

BACKGROUND OF THE INVENTION

Reliance on software-based data systems is increasing every year both as data becomes more important and as languages provide more options for obtaining additional value from the data and systems. Access to data in the data systems is also becoming more important, even at a user level, as the ability to implement higher-level, abstract languages becomes more common. However, the data in these underlying data systems (i.e., databases, information management systems, hierarchical data systems, etc.), is often of a prescribed layout, format and often content type. Therefore, before access may be optimized for a user using the data system through an intelligent data engine, for instance, defining the underlying metadata or metadata structure to the data engine or data system in these data systems is necessary.

Unfortunately, many data systems do not contain data layout or data type definitions, which are important to defining the underlying metadata. Instead, these data systems define byte arrays of user-defined sizes which are then available for storage or retrieval in response to access calls. As a result, since the data is not defined to the data system or database in these situations, a user is instead required to interpret the data in application code instead of being able to define the data to the database. Additionally, the user's defined interpretation of data, data types, and data definitions, may not be consistent with that of a data system, as often users define data definitions in terms of their business or may use predefined data types offered by a data management system. The resulting differences in data definitions (i.e., including data types, data interpretation, data definitions, etc., and used as herein as either "data definitions" or "data types") creates further limitations in effectively using a data engine. Traditionally, a data type is defined as one of sixteen primitive types: BOOLEAN, CHAR, VARCHAR, CLOB (character large block objects), TINYINT, SMALLINT, INT, BIGINT, FLOAT, DOUBLE, DECIMAL, DATA, TIME, TIMESTAMP, BINARY, or BLOB (binary large block objects), collectively "traditional data type" or "standard data type."

For instance, given the wide range of user-defined data types, a data engine is unable to accommodate such a wide range of data types and is therefore ineffective in intelligently interpreting the user-defined data types. Often, the user-defined data types may be unknown or not recognized by data engines, or may be non-standard particularly when compared to known data types of traditional data systems (i.e., "standard data types").

An example of such a limitation includes the situation where a user defines a DATE filed as the number of days since a product became publicly available for sale. In this situation, using the traditional data type DATE (i.e., "standard data type" DATE), a database conversion sequence would interpret the read integer as being the number of milliseconds from Jan. 1, 1970, yielding an incorrect result. Similar issues arise as between EBCDIC, ASCII and UNICODE, as well as big endian and little endian, and IEEE float and IBM float, for instance.

This result is also becoming more common as the traditional sixteen primitive data types are being challenged by competing efforts such as XML (Extensible Markup Language) Schema which comprise sixty-four extendable schema types thereby providing for an infinite number of data types. Traditionally, a database field type consisted of a reference to one pre-defined conversion sequence in relation to one of the sixteen primitive data types, where the conversion sequence provided conversion as between user semantic types and how the data was to be physically stored as bytes in a database. Traditionally, a database field is a collection of a name (i.e., reference to a field), length (i.e., reference size of the stored data) and type (i.e., reference to a known bytes interpretation methodology). A limitation to this traditional approach is that a user is restricted to both have user data types be only within the group of sixteen primitive types and control the database and data bytes so as to ensure compliance of data types to be within the sixteen primitive types. Unfortunately, these restrictions are no longer realistic in today's business environment.

Similarly, a data engine is unable to provide users with the intelligent functionality of access options for their data to meet the rising demands given the wide range of user-defined data types.

Therefore, it is highly desired to be able to provide a solution which overcomes the shortcomings and limitations of the present art and more particularly provides a method and system for referentially converting user-defined data types into recognizable standard data types for providing improved access to user data.

The present invention in accordance with its various implementations herein, addresses such needs.

SUMMARY OF THE INVENTION

In various implementations of the present invention, a method and system are provided for referentially converting user-defined data types into one or more recognizable standard data types thereby providing improved access to users with their user data.

The present invention in various implementation provides for a method and system for obtaining user data having one or more non-standard data types from data of a standard data type that is stored on a data storage device.

In one implementation, the present invention is a method for retrieving user data in a data system using one or more application programs for defining a layout for each user data type, defining one or more conversion routines, calling a coordination call, and retrieving the user data from the data storage device.

In another implementation, the present invention is a data system having computer-readable program code portions stored therein to receiving a request for user data, define a layout and conversion routines for user data, call a coordination call for mapping one or more conversion routines to one or more standard data types, and obtain the user data requested from the data storage device.

DETAILED DESCRIPTION

The present invention relates generally to a method and system for referentially converting user-defined data types into one or more recognizable standard data types thereby providing improved access to users with their user data.

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

As used herein, as will be appreciated, the invention and its agents, in one or more implementations, separately or jointly, may comprise any of software, firmware, program code, program products, custom coding, machine instructions, scripts, configuration, and applications with existing software, applications and data systems, and the like, without limitation.

Figure 1A:
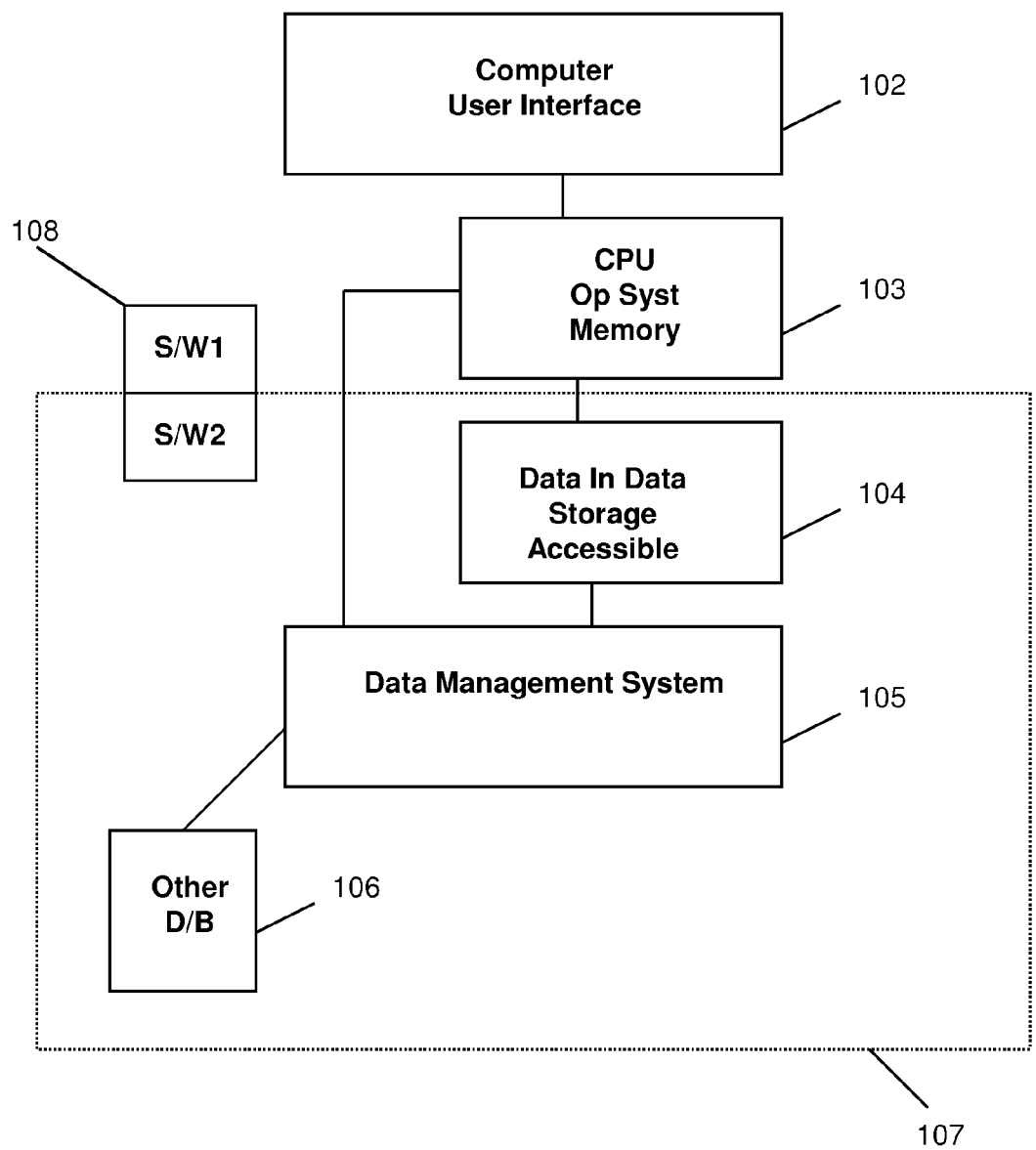
FIG. 1A depicts a typical data system with a user interface comprising a computer user interface in communication with a central processing unit (CPU)

FIG. 1A depicts a typical data system with a user interface 101 comprising a computer user interface 102 in communication with a central processing unit (CPU) at 103. Also at 103, the CPU is typically connected or in communication with internal memory and a capability to interface with a user through an application, program code or other software, including an operating system. Data is accessible by the user through the interface, commands being instructed in response by the CPU, to obtain data in a data storage device or area at 104. Alternatively data may be accessed through a data management system directly or indirectly, often through a data engine, at 105. The data management system is typically for managing data in the data system in a manner such as on a transactional basis, but not limited to such. Other data storage centers, devices and databases are also typically accessible through a data management system, such as at 106. Further, a user or data management system may access or have instructions from applications apart from the data system, such as those at 108. As depicted in FIG. 1A, by example, the data system includes the portion depicted as block 107, although in other implementations, a data system may comprise more, less or all of that depicted in FIG. 1A. As used herein the term data system includes data processing systems and their associated hardware and software, typically having files organized in one or more databases in communication with hardware and software available for a user via a user interface available through an operating system.

Figure 1B:
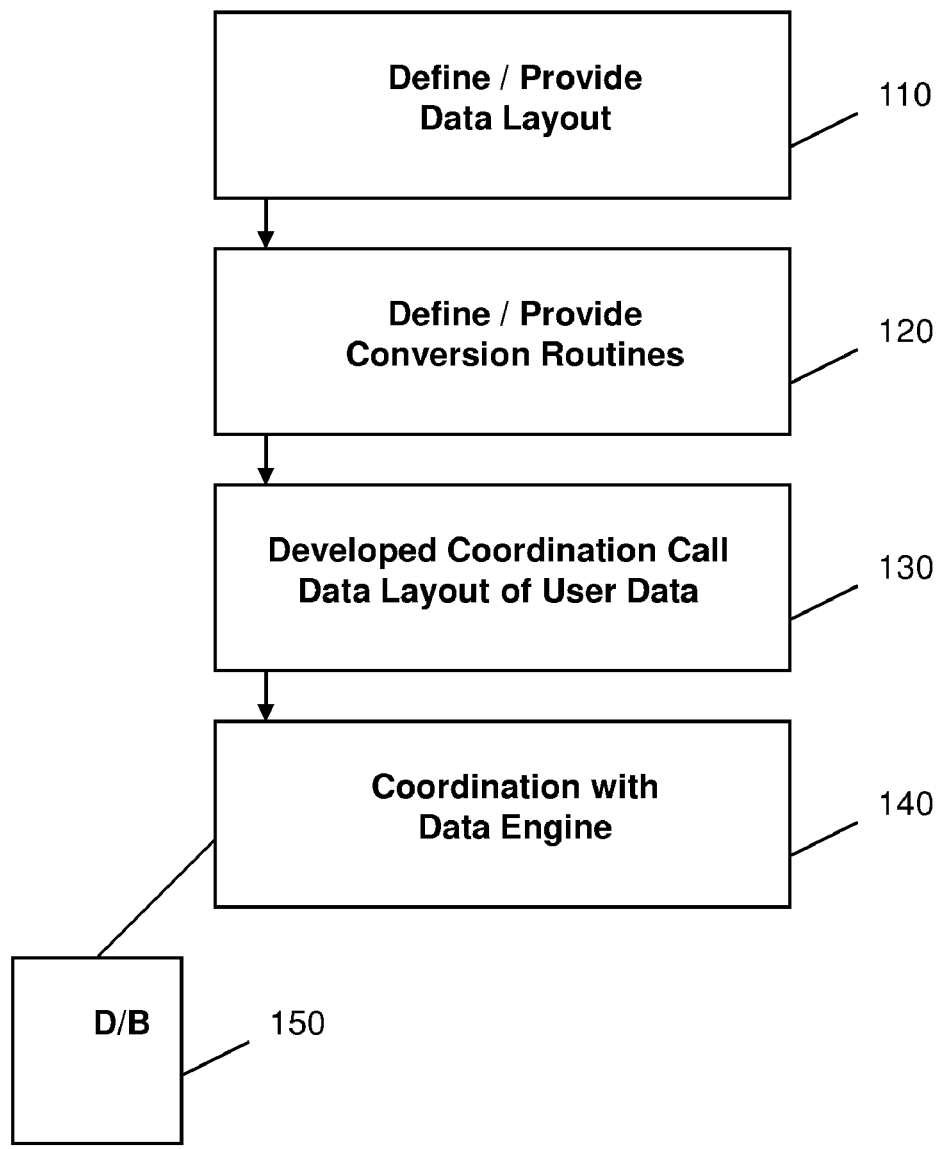
FIG. 1B depicts a flowchart of the present invention in accordance with an implementation thereof.

FIG. 1B depicts a flowchart 100 of the present invention in accordance with an implementation thereof.

From FIG. 1B, a layout of the data type and data of the user data is defined at 110. In defining the layout, a user preferably may include their data type classes for their data along with data system segment fields. At 120, a conversion routine for converting the user-defined data type to the standard data type using the referenced data system segment fields, for instance, is set forth. The conversion routine may comprise any of software, firmware, program code, program products, custom coding, machine instructions, scripts, configuration, and applications with existing software, applications and data systems, and the like, without limitation. The conversion routine may further be in any program language or type, a function pointer, be dynamically linked or other associated mechanism, such that if the conversion routine were used in an object-oriented environment, for instance, the conversion routine could be of an abstract of TypeConverter class.

A Coordination Call is developed at 130 in relation to the defined data layouts and the conversion routines, where it is further envisioned that the Coordination Call be a software routine instantiable at runtime, for instance, which calls the provided data layout and conversion routines, and performs the converting activities by assigning the converter to a database segment and calling the user-defined data type. Further, optionally, the Coordination Call may also call or gather the associated data sought by a user using standard data types from the data engine. At runtime, or upon further instantiation, the Coordination Call gathers the data sought through a data engine, at 140, which may further access one or more databases, at 150.

In alternate implementation, the conversion routine and the Coordination Call may be of a concurrent step, a single software application, single function, include both serialization and conversion routines, or common instruction code.

Figure 2:
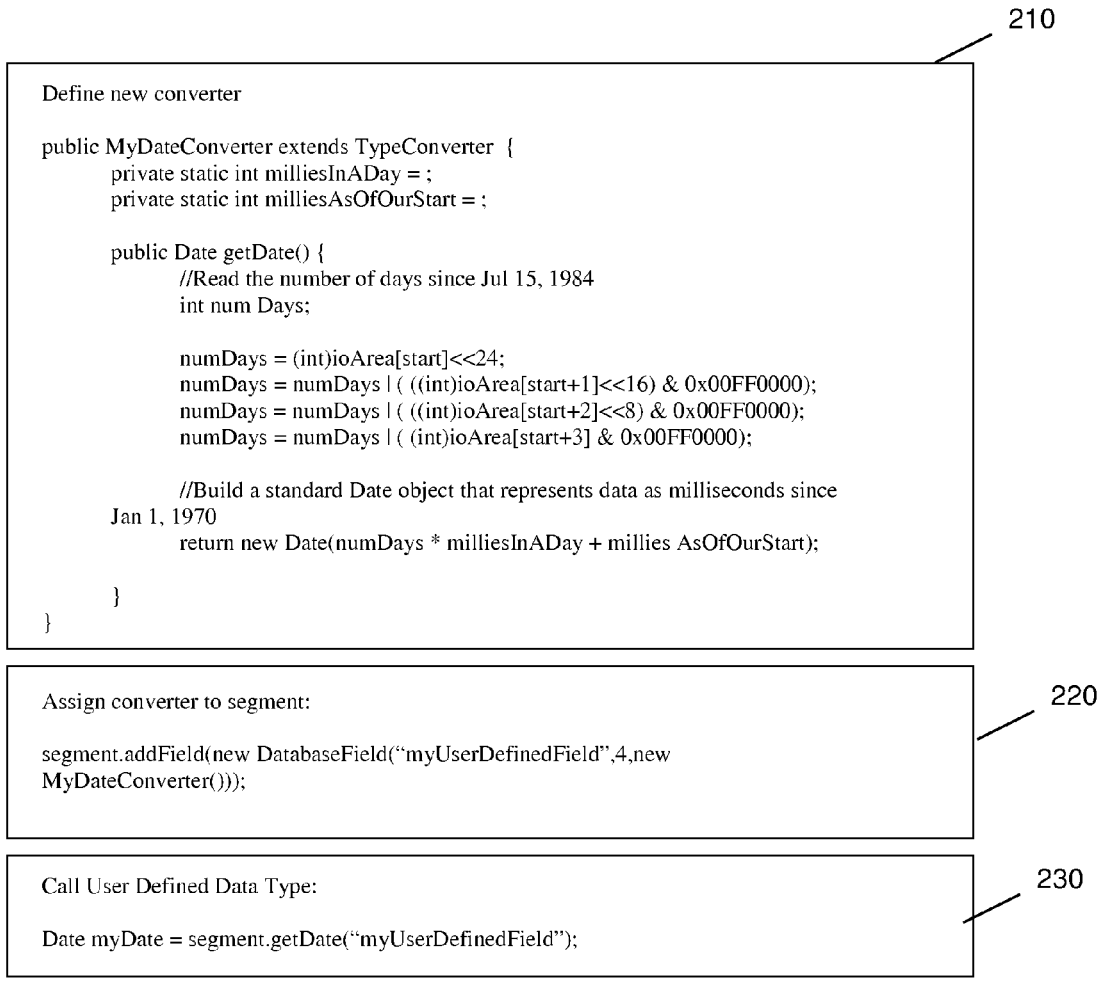
FIG. 2 depicts an example of a Coordination Call in an implementation of the present invention in which a converter is defined, the converter is assigned, and the converter calls a user-defined data type; and, FIG. 3 depicts an operational flowchart of the present invention in accordance with an implementation thereof.

FIG. 2 depicts an example of a Coordination Call 200 in an implementation of the present invention in which a converter is defined, the converter is assigned, and the converter calls a user-defined data type. From FIG. 2, the converter is defined at 210, which provides for converting the user's definition of days to milliseconds for a DATE field. At 220, converter is assigned to the segment. At 230, the converter calls a user-defined data type related to the DATE.

Figure 3:
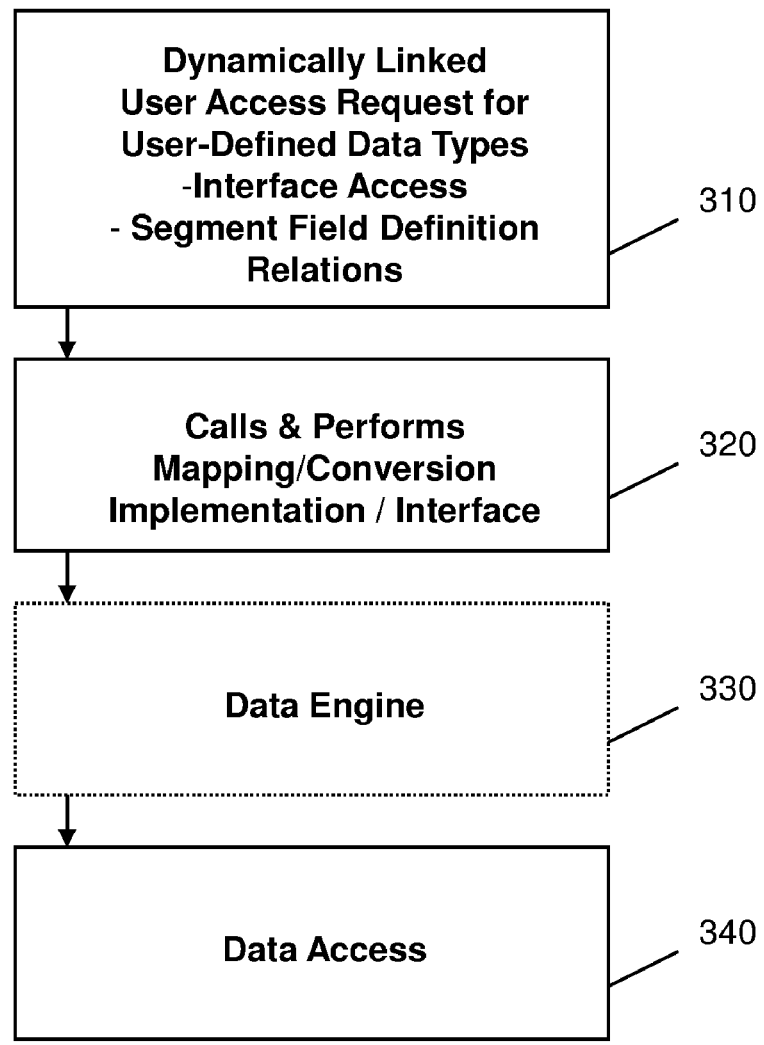

FIG. 3 depicts an operational flowchart 300 of the present invention in accordance with an implementation thereof.

From FIG. 3, a user defines data of interest for access by providing user-defined data type definitions and conversion relationships relating user data types with standard data types at 310. Operatively, in one or more implementations of the present invention, the user defines a data field in a database segment or a table in a database as a name, a length and a conversion routine, where the conversion routine is defined by the user for converting a user-defined data type to a standard data type. In the event the user-defined data type were identical to a standard data type, no further conversion routine would need to be defined by the user. The user-defined data type is dynamically linked with the user conversion routine, and thereby avoids traditional problems of accommodating changes without interrupting the data system.

At 320, a Coordination Call or conversion routine performance the conversion activities in relation to the user data type, database and conversion relationship. In certain implementations, at 320, the Coordination Call defines the conversion routine, assigns the conversion routine to a segment, and thereafter calls user data types in relation to the conversion routine. The Coordination Call also performs and manages the mapping as between the user-defined data types, standard data types and other referential data types of which conversion may involve. Optionally, at 330, a data engine is invoked to perform the commands of the Coordination Call or conversion routine to a remote database. Data access is available at 340.

The present invention in one or more implementations may be implemented as part of a data system, an application operable with a data system, a remote software application for use with a data storage system or device, and in other arrangements.

The present invention, in one or more implementations, is advantageous over the limitations of the traditional approach as users may define their own data types in view of their specific needs, access their data transparently, and not be required to replace entire data systems. Further the present invention does not require a data system to use a catalog or have a data system access a catalog to perform data type checking or conversion.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

Various implementations of a data retrieving method and system have been described. Nevertheless, one of ordinary skill in the art will readily recognize that various modifications may be made to the implementations, and any variations would be within the spirit and scope of the present invention. For example, the above-described process flow is described with reference to a particular ordering of process actions. However, the ordering of many of the described process actions may be changed without affecting the scope or operation of the invention. Accordingly, many modifications may be made by one of ordinary skill in the art without departing from the spirit and scope of the following claims.

What is claimed is:

1. A computerized method for enabling retrieval of user data having one or more user-defined non-standard data types stored on a data storage device of a data system having a centralized processing unit (CPU), memory, an operating system, user interface, and a data management system, using one or more application programs apart from the data system and having program instructions, the method comprising:

defining a layout for each user-defined non-standard data type of the user data, the layout providing one or more user data fields having the one or more user-defined non-standard data types, wherein the data system does not include data type definitions and the data system defines the data fields as byte arrays of user-defined sizes, wherein the byte arrays are not defined as types to the data system;

defining one or more conversion routines for each user-defined non-standard data type in relation to one or more associated standard data types, wherein the user-defined non-standard data types and the associated standard data types are each a data definition that defines data for interpretation, the user-defined non-standard data types being defined and interpreted differently than the associated standard data types; and providing a coordination call for mapping the one or more conversion routines to the one or more associated standard data types such that in response to the coordination call being called, the one or more conversion routines convert the one or more user-defined non-standard data types of the user data to the one or more associated standard data types, wherein in response to a user access request for the user data, the coordination call is called and the user data is retrieved from the data storage device and converted to the one or more associated standard data types, wherein the one or more application programs interpret the user data.

2. The method of claim 1, wherein the layout is dynamically linked with one or more of the conversion routines and coordination call such that the conversion routine is linked and used during the user access request to convert the user data from the one or more user-defined non-standard data types to the one or more associated standard data types.

3. The method of claim 2 further comprising receiving a user request from the user interface, invoking a data engine to access the data, and displaying the retrieved user data to the user interface.

4. The method of claim 1 wherein the data system does not use or access a catalog to perform data type checking or data type conversion.

5. A data system having an instantiable computer program product for enabling retrieval of user data having one or more user-defined non-standard data types stored on a data storage device accessible by the data system, comprising a computer-readable storage medium having computer-readable program code portions stored therein, the computer-readable program code portions including a first executable portion having instructions being capable of:

defining a layout for each non-standard data type of user data, the layout providing one or more user data fields having the one or more user-defined non-standard data types, wherein the data system defines the data fields as byte arrays of user-defined sizes and the byte arrays are not defined as types to the data system;

defining one or more conversion routines for each user-defined non-standard data type in relation to one or more associated standard data types, wherein the user-defined non-standard data types and the associated standard data types are each data definitions that define data for interpretation, the user-defined non-standard data types being defined and interpreted differently than the associated standard data types;

in response to a user access request for the user data, calling a coordination call for mapping the one or more conversion routines to the one or more associated standard data types such that the one or more conversion routines convert the one or more user-defined non-standard data types of the user data to the one or more associated standard data types; and in response to the user access request for the user data, accessing one or more databases and obtaining the user data from the data storage device, the obtained user data being converted to the one or more associated standard data types using the coordination call, and providing the user data to one or more application programs to interpret the user data, the one or more application programs being apart from the data system.

6. The system of claim 5, wherein at least the layout is dynamically linked with one or more of the conversion routine and coordination call such that the conversion routine is linked and used during the user access request to convert the user data from the one or more user-defined non-standard data types to the one or more associated standard data types.

7. The system of claim 6 further comprising invoking a data engine of the system to access the data from one or more databases of the system, and providing the retrieved user data to the user interface.

8. The system of claim 5 wherein the data system does not use or access a catalog to perform data type checking or data type conversion.

* * * * *